May 28, 1968  G. GRÜN  3,385,724
PROCESS AND DEVICE FOR CONTINUOUSLY TREATING POWDERED
MATERIALS WITH STABILIZING SUBSTANCES
Filed Dec. 2, 1965  2 Sheets-Sheet 1

INVENTOR.
GUSTAV GRÜN
BY
ATTORNEYS.

May 28, 1968 G. GRÜN 3,385,724
PROCESS AND DEVICE FOR CONTINUOUSLY TREATING POWDERED
MATERIALS WITH STABILIZING SUBSTANCES
Filed Dec. 2, 1965 2 Sheets-Sheet 2

INVENTOR.
GUSTAV GRÜN
BY
McGlew & Toren
ATTORNEYS.

United States Patent Office 3,385,724
Patented May 28, 1968

3,385,724
PROCESS AND DEVICE FOR CONTINUOUSLY TREATING POWDERED MATERIALS WITH STABILIZING SUBSTANCES
Gustav Grün, Lissberg, Oberhessen, Germany
Continuation-in-part of application Ser. No. 93,011, Mar. 1, 1961. This application Dec. 2, 1965, Ser. No. 511,589
Claims priority, application Germany, Mar. 2, 1960, G 29,141
19 Claims. (Cl. 117—100)

This is a continuation-in-part of application Ser. No. 93,011, filed by the present inventor on Mar. 1, 1961, and now abandoned.

This invention relates in general to a process for treating powdered or ganulated substances and in particular to a new and useful process and method for the treatment of substance in powdered or ganulated form with active or stabilizing substances in gaseous, liquid or solid form.

The present invention is particularly applicable for adding of certain materials to substances in powdered or granulated form in order to enhance or instill a characteristic or property to the substance which is not necessarily inherent therein in the nature in which it exists. For example, in some instances it is required that a milk powder be enhanced with a fat content higher than normal for some particular dietary reason. The apparatus for effecting such fat content condition prior to the present invention was both costly and complicated.

In the case of a powdered substance, such as powdered milk which is treated to add a milk fat content, there is a tendency for the added material to cause the formation of lumps and in some instances the product must be stored for several days in a cold storage room after the lump formation occurs in order to permit it to be treated further by comminution means.

Another example of the application of the present invention is for adding a coloring or dye to a finely comminuted or powdered substance, such as talcum powder. In such a case small quantities of concentrated dyestuff have to be admixed in fine spray distribution with the basic materials to be dyed, and here again this has only been possible by means of large complicated and expensive installations. Another example is insecticide which requires that an active substance be mechanically admixed with the carrier or support in a known process without achieving a stable bonding of both substances so that separation occurs between the carrier and the substance, such as upon spraying from an aircraft.

A further example is that with the use of dextrin as an adhesive substance it is necessary that the adhesive dissolve quickly and satisfactorily in water and this can only be achieved by increasing the moisture content of the dextrin powder, and here again lump formations are apt to occur which much be comminuted in a hammer-mill.

The present invention provides a simple and effective method of obtaining a firm bonding between active and carrier substances and/or the uniform treatment of substances in powdered or ganulated form. In accordance with the invention, the material to be treated is thoroughly whirled by means of an injected gas, such as air, by a suction whirling effect. Active substances and stabilizing substances in liquid, gaseous or powder form or any mixture of such substances are sprayed onto the material. The strength and the direction of the upwardly flowing agitating gas stream is such that it permits only treated particles to discharge through the material outlet, whereas the untreated particles are returned into the spraying zone of the active or stabilizing substances. The particles which are withdrawn with the gas stream are collected on filters on the delivery side and returned to the treatment cycle.

In accordance with the invention, apparatus is provided which includes a chamber for mixing the various components which advantageously comprises an upright cylindrical container which is tapered conically toward the bottom and has inlet and outlet apertures which are adapted to be closed. A gas stream is directed into the inlet at the lower portion of the container which is directed upwardly through the container. One or more outlets are provided at the upper end of the container and one or more spray nozzles are provided for the active substance or stabilizing agent which is to be admixed with the material in the container.

The container in which the mixing is accomplished advantageously comprises a conical lower portion opening to a flared section through which a gas may be admitted, for example, through a plurality of ports. In addition, gas is directed at high velocity upwardly into the container and the material to be treated is directed into the container at the upper end downwardly in a tangential whirling movement. The arrangement is such that untreated materials are removed through one or more separator devices which again recirculate the materials back for treatment in the mixing container.

In accordance with still another feature of the invention, material is delivered to the upper portion of the mixing container in a downward tangential direction. A separator is arranged in the upper end to remove particles separated out of the treatment chamber while imparting a spinning motion to the particles therein. A single nozzle is provided at the lower end of the container which is supplied with the active and stabilizing substances and also with compressed air.

Accordingly, it is an object of the invention to provide an improved process for mixing an active or stabilizing substance to a powdered material.

A further object of the invention is to provide an apparatus for admixing an active or stabilizing substance, usually a liquid or a liquid slurry, to a powdered material.

A further object of the invention is to provide an apparatus for the admixing or treatment of a substance in powdered form with a liquid, solid or gaseous substance, including means for whirling the substance to be treated as the substance to be added is sprayed thereon.

A further object of the invention is to provide an apparatus for the treatment of powdered materials comprising means for directing the powdered materials into a container at high velocity and with a whirling motion and means for spraying an additional substance into said container.

A further object of the invention is to provide an apparatus for treatment of powdered material comprising means for directing the powdered material into a container and employing a carrier fluid for whirling said material including means for adding a treatment substance to said first material as it is whirled and further including means for removing materials which are not effectively treated and re-directing them to the container.

A further object of the invention is to provide a treatment apparatus for powdered materials which is simple in design, rugged in construction and economical to manufacture.

The various features of novelty which characterize the invention are pointed out with particularity in the claims annexed to and forming part of this specification. For a better understanding of the invention, its operating advantages and specific objects attained by its use, reference should be had to the accompanying drawings and descriptive matter in which there are illustrated and described preferred embodiments of the invention.

Figure 1:
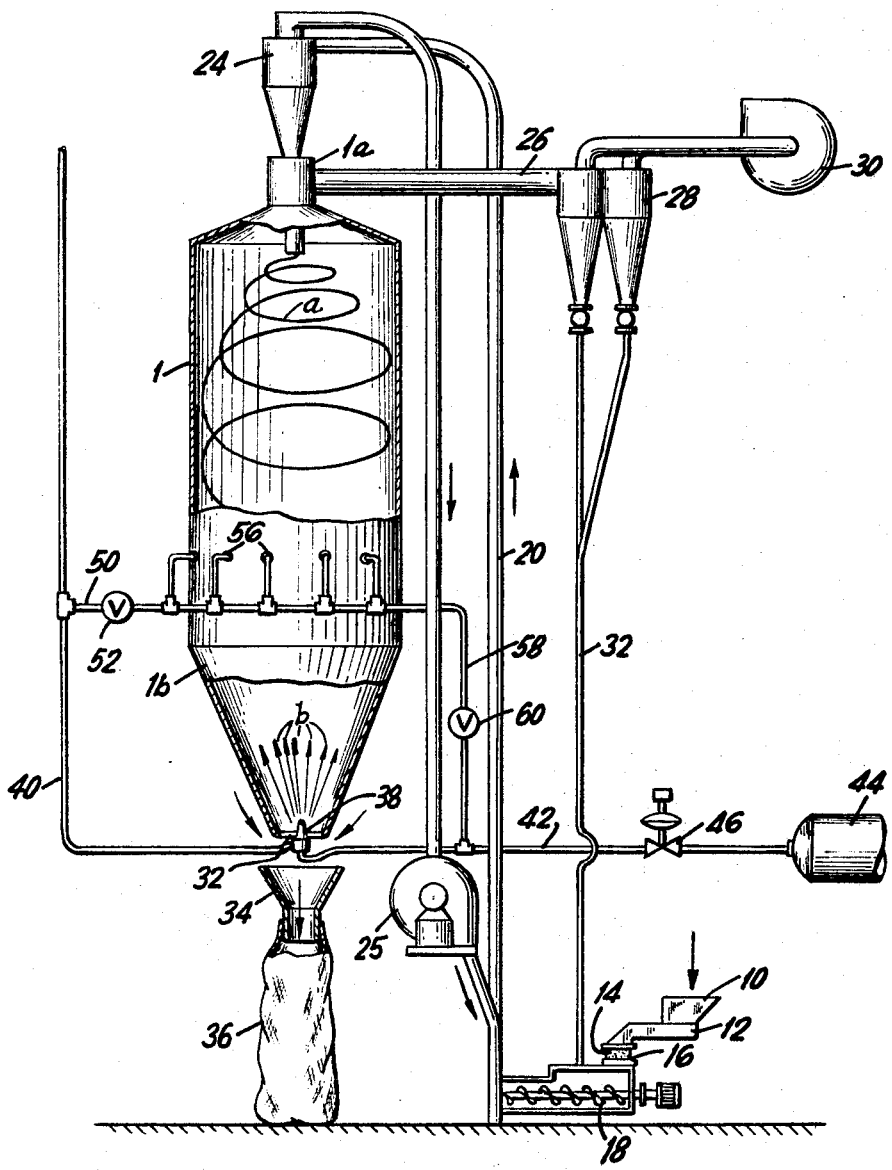
FIG. 1 is a somewhat schematic partial transverse sectional and partial elevational view of a device for treating powdered materials in accordance with the invention.

Referring to the drawings in particular, the invention embodied therein includes an arrangement for the treatment of a predetermined quantity of substances in powder or granulated form wherein the quantity of the substance is not premixed. The apparatus includes a vertically elongated substantially cylindrical container or reaction vessel 1 in which a granular or powdered substance to be treated is mixed with another substance, for example, a liquid.

In the embodiment illustrated, the material to be treated is introduced in powdered or granular form into a feed hopper 10 and through a proportioning device 12 past an inspection window 14 in a lock chamber 16 to a conveyor or feed worm 18. The material is delivered to a supply pipe 20 under pressure and air from a fan 25 is admixed thereto. The air-borne material is directed into a separator 24 which delivers the material downwardly through an immersion tube 24' into the container 1 in a whirling tangential downward flow against the interior wall of the container.

In the embodiment illustrated the lower end of the separator 24 is located well down within the container 1 at a central or axial location so that the material to be treated flows downwardly through a rising tangentially directed upwardly flowing secondary fluid or agitating fluid, such as air. The upper part of the container 1 includes a substantially cylindrical withdrawal chamber 1a which is connected to a conduit 26, separator 28 and suction blower 30. The blower causes withdrawal of the lighter fluids and the particles which have not been treated and are very light, through the conduit 26 and the twin separators 28. Materials which are separated are directed backwardly through a conduit 32 into the feed conveyor 18.

In accordance with a feature of the invention, the lower portion of the chamber 1 is provided with a frusto-conical portion 1b which terminates in a substantially cylindrical opening 32 to permit the introduction of a secondary fluid such as air into the chamber 1. A fixed cylindrical extension or loading hopper 34 is located below the opening 32 in a position to collect and direct the treated material downwardly into a container or sack 36 which may be attached to the lower end thereof. The construction is such that the treated material may be continuously moved downwardly through the opening 32 under the influence of gravity while the treating fluid such as air or other fluid is drawn upwardly through the opening by the action of the blower 30.

In one operating arrangement, a treating fluid is introduced into the reaction chamber 1 through a nozzle 38 which is located in the opening 32 and oriented to direct the secondary fluid upwardly to react with the material dropping downwardly from the lower end of the separator 24 and through the container 1. The nozzle 38 is advantageously a double nozzle and is supplied both with a secondary treating substance, through a conduit 40, and with compressed gas, through a conduit 42. The gas is directed to the conduit 42 from a reservoir supply 44 under the control of a valve 46 arranged in the conduit 42. The nozzle directs the secondary substance (usually liquid) upwardly in a fine conical spray as indicated by the arrows b in a direction against the downwardly whirling substance indicated by the arrows a.

A principal advantage of the process of the present invention is that it is continuous by providing a system in which there is a bottom opening 32 thorugh which the treated material may continuously pass. It is possible to regulate the material flow through this opening so that only the treated substances will be collected in the containers or sacks 36. Only the materials which are fully treated and which have achieved a weight sufficient to overcome the reduced upward flow through the opening 32 will fall downwardly through this opening. The upward flow of secondary fluid such as air through the opening 32 may be regulated by regulating the suction blower 30 such as by a throttle in the conduit 26 or by regulating the size of the opening 32 or both. The downwardly flowing whirling material a will intermix with the upwardly sprayed material b continuously in the container 1, and those particles which have been thoroughly intermixed and have received an increased weight as a result thereof will fall downward through the opening 32 while the still untreated particles will remain in the reaction chamber. Some of the very light particles and the upcoming air are removed through the cylindrical portion 1a and the conduit 26 to the separator 28 during this continuous operation.

In some instances it is desirable to direct a treating liquid from the conduit 40 through a conduit 50 controlled by a valve 52 for directing the secondary fluid through one or more of a plurality of nozzles 56 which are arranged to direct a spray of the secondary fluid into the container 1 at a plurality of circumferentially spaced locations around the periphery of the container 1. A compressed gas may also be introduced through a conduit 58 under the control of a valve 60.

The inventive device operates to provide a continuous treatment of materials by directing, for example, a liquid into a cloud of powdered or granular substance in a continuous flow. The granular materials are introduced from the top of the container 1 and preferably at an axial or central location and whirled tangentially downwardly by the action of the separator 24 and fan 25 and directed against the upcoming flow stream of a secondary or agitating fluid such as air. The air is admitted continuously through the opened end at the lower portion of the container 1 at a rate to permit the treated particles to drop through the same opening. A secondary treatment liquid may be introduced through the nozzle 38 adjacent the bottom opening of the container for upward flow against the downward flow of the solid particles and preferably in a whirling direction as indicated by the arrow. After the materials are treated, they become heavier and they fall by gravity through the opening 32 and into the collecting container 36. The agitating fluid and those particles which are not treated and are relatively light are withdrawn by the action of the suction blower 30 through the conduit 26, and the heavier particles are separated in the separator 28 and are returned to the process for further treatment.

A feature of the provision of supplemental nozzles around the circumference of the container for directing the secondary treatment liquid to the powdered material or granulated material being treated is that various degrees of treatment may be easily effected without disturbing the continuous operation of the process.

Figure 2:
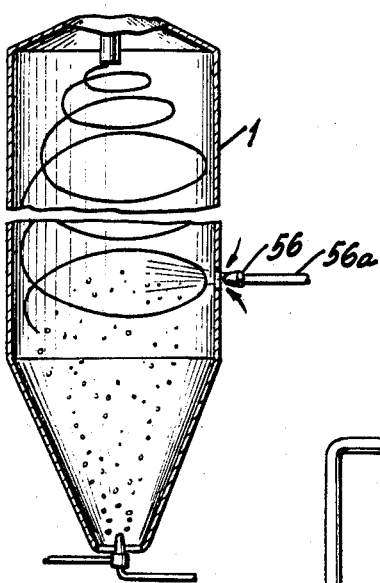
FIG. 2 is a somewhat schematic sectional view of the apparatus indicated in FIG. 1 showing the formation of the coated particles.

As indicated particularly in FIG. 2, the nozzles 56 are arranged so that their outer tips are disposed at an outwardly spaced location from the exterior of the wall of the container 1. For this purpose the nozzle conduit 56a is advantageously made of a semi-rigid material which permits it to be bent or folded inwardly and outwardly for facilitating the alignment of the end of the nozzle in respect to the exterior of the container 1. Generally speaking it is preferable to use only the nozzles 56 for the introduction of a secondary fluid rather than the nozzle 38 at the lower end of the container because the nozzles 56 can operate without any danger of fouling. This is further facilitated by the mounting of the nozzle such that it is outside of the wall of the container 1 so that an induced air flow indicated by the arrows around the nozzle in FIG. 2 will be directed around the ends of the nozzle and into the chamber. This incoming air will effect the cleaning of the nozzles and in addition it will sweep around the interior walls of the container 1 and maintain them free of any particles. A further advantage in the mounting of the nozzles 56 such that they are on the exterior of the wall 1 is that the operation thereof can always be seen and any stopping of any one nozzle can be readily observed.

Figure 3:
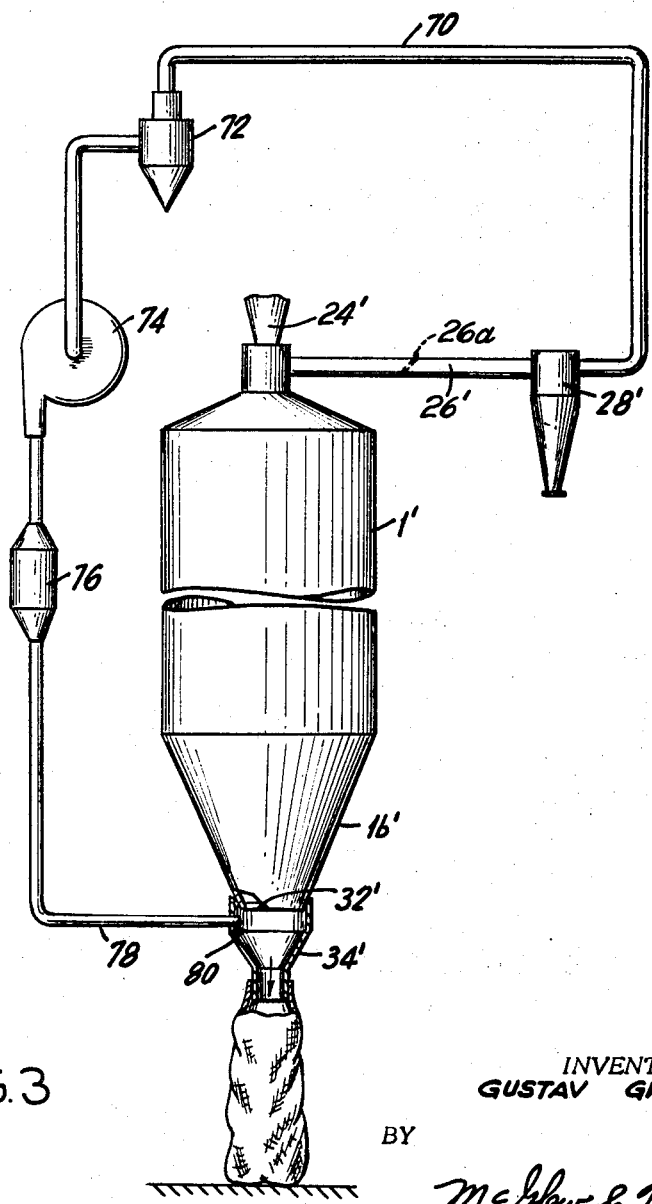
FIG. 3 is a schematic view of another embodiment of the invention.

The apparatus indicated in FIG. 3 is particularly applicable for use where the materials to be treated are either fats or starches. In the event that fat containing material is to be treated, it is advantageous to cool the liquid fat which has been sprayed in at the surface in order to be able to discharge the mixture of fat with dry material from the container in a condition in which the material easily flows. The system indicated in FIG. 3 includes a container 1' similar to that of the other embodiment with the exception that material is withdrawn from the container 1' into the separator 28' and then through a conduit 70 and into a filter 72 where the solid particles are removed. Thereafter, a suction blower 74 moves the particles into a device 76 which may be operated as a refrigerating cooler to cool the air flowing therethrough. The cooled air is circulated through a conduit 78 and into an annular space 80 formed by a separation of a collecting spout 34' from the lower portion 1b' of the container 1'. The conduit 26' includes an adjustable damper 26a.

In the treatment of starches it has been found that the chemical reaction and the intermixing of the materials may be facilitated by heating the air which is directed upwardly through the opening 32'. In such instances the device 76 is operated as a heater. For this purpose the device 76 may be a combination heater or cooling element which may be selectively operated for heating or cooling or it may include separate elements for effecting the desired results. The amount of heating or cooling of course is regulated in accordance with experience and in accordance with the indicated formations of the materials which are being mixed.

While specific embodiments of the invention have been shown and described in detail to illustrate the principles of the invention, it will be understood that the invention may be embodied otherwise without departing from such principles.

What is claimed is:

1. A process for treating a first substance in powder, granular and similar form with a second substance in fluid form within a reaction chamber having an outlet at the lowermost end thereof, comprising continuously directing a first substance to be treated downwardly into the reaction chamber, continuously directing a second substance against said first substance, and continuously exhausting the upper end of the reaction chamber to direct air into the opening at the lowermost end of the reaction chamber and thence upwardly into the reaction chamber and through said first and second substances to cause the particles of the first substance to swirl in a cloud formation and to cause the second substance to treat the particles of said first substance while continuously removing gas and entrained particles from the upper end of said reaction chamber, the exhausting being done by an amount and rate sufficient to maintain the lighter untreated substances in whirling motion in the cloud formation, and continuously removing heavier particles of said first substance which have been treated with said second substance through the opening at the lowermost end of the reaction chamber by the action of gravity.

2. A process according to claim 1, wherein said second substance is directed upwardly against said first substance.

3. A process according to claim 1, wherein said second substance is directed across the flow of said first substance.

4. A proces according to claim 1, wherein said second substance is directed across the flow of said first substance at a plurality of radially inwardly directed locations.

5. A process for treating a first substance with a second substance according to claim 1, wherein the gas and entrained particles removed from the upper end of said reaction chamber are treated and returned to the lower end of said reaction chamber.

6. A process according to claim 5, wherein said removed gas is cooled prior to returning to the lower end of said container.

7. A process according to claim 5, wherein said removed gas is heated and then returned to the lower portion of said container.

8. A continuous process for treating a first substance in powdered, granular and similar form with a second substance in fluid form within a reaction chamber having an outlet at the lowermost end thereof, comprising directing the first substance to be treated tangentially into the reaction chamber to permit it to move downwardly in a whirling manner under the forces of gravity along the walls of the chamber continuously, directing a carrier fluid upwardly into the reaction chamber and through the first substance to cause the particles of the first substance to swirl in a cloud formation within the reaction chamber, directing the second substance in the cloud formation to cause it to treat the particles of said first substance, applying a suction to the upper portion of said container for establishment of a gas flow from the exterior into the outlet and from the outlet through the length of the reaction chamber to the source of suction and for removing entrained particles which have not been treated with the second substance and the carrier fluid, subjecting the removed particles to separation and returning the untreated particles to the reaction chamber, said gas flow being directed upwardly adjacent the outlet at the lower end of said reaction chamber in quantities and at a rate sufficient to maintain the lighter untreated particles in whirling motion in the cloud formation, and continuously removing the heavier particles of the first substance which have been treated with said second substance through the opening at the lowermost end of the reaction chamber by the action of gravity.

9. A device for continuously treating powdered and granular materials with a secondary substance comprising a vertically elongated container having a lower relatively narrow dimensioned portion terminating in an opening to atmosphere in the lowermost part thereof for the continuous discharge of material therethrough and for the intake of air therethrough, means to direct a powdered material downwardly into said container in a whirling movement, means to direct a secondary material such as a liquid against said downwardly moving first material, and exhauster means connected to the upper end of said container for removing gas and entrained particles form the upper portion of said container and for agitating the material to be treated and intermixing it with the secondary material, said exhauster means taking suction directly from the opening in the lowermost part of said container and being connected to the upper portion of said container for controlling the discharge of treated patricles and for removing the lighter particles therefrom continuously, said exhauster means being operated with a force to direct air upwardly in a sufficient force to sustain untreated particles within said container and prevent them from being discharged through said opening until they have accumulated sufficient weight by the mixing of the secondary material thereto to drop by their own weight through said opening.

10. A device according to claim 9, wherein said means for directing a secondary material against said first material includes a nozzle located in the opening of said container.

11. A device according to claim 9, wherein said means for directing a secondary fluid against said first material includes a plurality of nozzles located at spaced circumferential locations around the periphery of said container for directing a secondary liquid into said container at such locations.

12. A device according to claim 9, wherein said exhauster means for removing gas and entrained particles from the upper end of said container includes means for separating entrained particles therefrom and returning them to said container, and a blower connected to said separating means for withdrawing air from said separating means and said container.

13. A device according to claim 9, including nozzle means intermediate the height of said container for directing the secondary material into said container, means for mounting said nozzle means such that its outer tip is located exterior of the wall of said container and arranged to direct the spray of material through an opening of said container, said opening being large enough to permit the inflow of air with the material being sprayed into said container.

14. A device according to claim 13, including means for adjustably positioning said nozzle in respect to the wall of said container.

15. A device according to claim 9, including means for heating air admitted through the lower opening in said container.

16. A device according to claim 9, including means for cooling the air directed into the lower end of said container.

17. A device according to claim 9, wherein said exhauster means is connected to a filter and to means for selectively heating and cooling the air, and for directing the treated air back into the lower end of said container.

18. A device for treating a first powdered or granular material with a secondary substance such as a liquid comprising a reaction chamber, means for introducing the first material tangentially into said reaction chamber adjacent the walls of the upper portion thereof and for directing it in a downward whirling movement, means for directing the secondary substance onto the first substance as it is whirled in the reaction chamber, said reaction chamber having at the bottom thereof a permanently opened to discharge to atmosphere for the treated material, and means for continuously applying suction at the upper portion of said reaction chamber for continuously controlling the removal of the granular particles by regulating the velocity of the gas flow entering said discharge and flowing upwardly through the reaction chamber under pressure through said first substance, said suction applying means being sufficient to maintain the not yet sufficiently treated lighter particles in a moving suspension within said reaction chamber and to permit downward movement and discharge of the heavier particles through said discharge.

19. A device according to claim 18, wherein said means for introducing said first material is an immersion tube and wherein said means for applying suction, for regulating the velocity of said gas flow and for maintaining the not yet sufficiently treated lighter particles in moving suspension within said reaction chamber is an exhaustor connected to the top of the chamber and connected in series to a separator.

References Cited
UNITED STATES PATENTS

| | | | |
|---|---|---|---|
| 2,054,441 | 9/1936 | Peebles | 159—4 |
| 2,270,341 | 1/1942 | Ransburg | 117—100 X |
| 2,363,281 | 11/1944 | Arnold | 117—10 |
| 2,414,625 | 1/1947 | Abrams et al. | 252—190 |
| 2,561,392 | 7/1951 | Marshall | 117—100 |
| 2,561,393 | 7/1951 | Marshall | 117—100 |
| 2,768,095 | 10/1956 | Tadema et al. | 117—100 |
| 2,856,351 | 10/1958 | Welty et al. | 208—140 |
| 2,986,475 | 5/1961 | Mesnard et al. | 117—100 |
| 3,077,385 | 2/1963 | Robb | 23—208 |
| 3,089,824 | 5/1963 | Wurster | 167—82 |
| 3,108,022 | 10/1963 | Church | 117—18 X |
| 3,117,027 | 1/1964 | Lindlof et al. | 117—100 X |

WILLIAM D. MARTIN, *Primary Examiner.*

M. SOFOCOLEOUS, E. J. CABIC, *Assistant Examiners.*